Patented Aug. 23, 1938

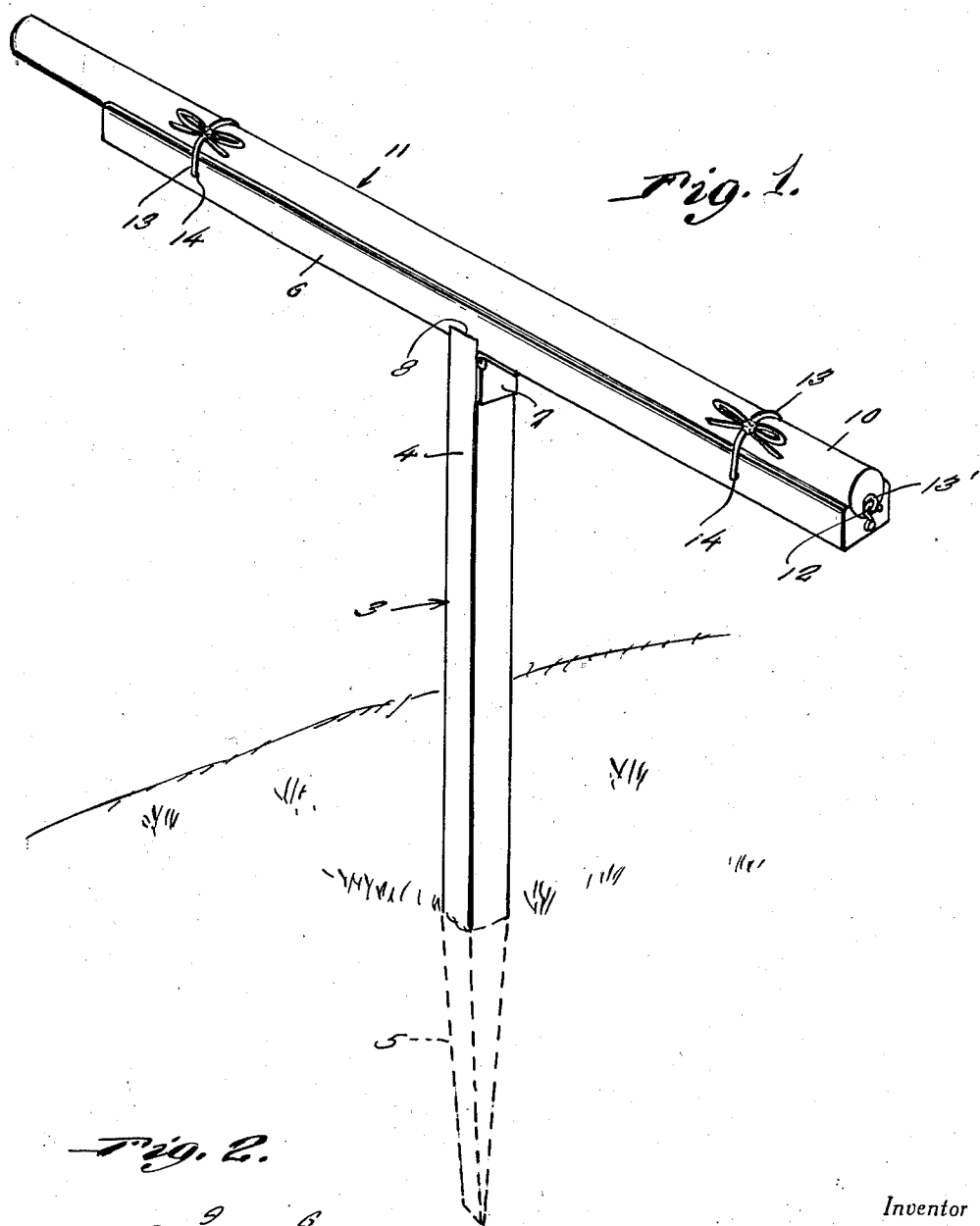

2,127,790

UNITED STATES PATENT OFFICE 2,127,790

FISHING ROD HOLDER

Tommie Louise Gayden Smoot, Whitfield, Miss.

Application October 21, 1937, Serial No. 170,276

1 Claim. (Cl. 248—38)

This invention relates to angler's equipment and accessories and has reference in particular to a portable collapsible style jack such as may be conveniently used as a temporary and convenient support and holder for a conventional fishing rod or pole.

As implied by the preceding introductory and general statement of the invention, I have recently discovered that structures have been patented and recommended for use to accomplish substantially the same result with which we are here concerned. Thus, it is admittedly old to utilize a so-called portable jack for temporarily supporting and holding in an elevated position, above the ground, a fishing rod. Notwithstanding this recognized development of the prior field of invention, I have, nevertheless perfected what I believe to be a more adequate and aptly fitted device for such purposes.

It follows, therefore, that my primary aim is to generally improve upon known prior patented structures by perfecting an arrangement calculated to be more efficient, simple and inexpensive, whereby to render it acceptable as a competitive commercial article as well as one which accomplishes desired results to best advantage of the user.

Briefly described, the preferred embodiment of the invention is characterized by a substantially T-shaped contrivance, which arrangement provides a desired ground anchoring stake as well as an appropriate head on which the handle portion of the conventional fishing rod may be detachably fastened whenever necessary or desired.

Other features and advantages will become more readily apparent from the following description and accompanying illustrative drawing.

In the drawing:

Figure 1 is a perspective view of the substantially T-shaped jack or rod holder constructed in accordance with the principles of the present inventive conception.

Figure 2 is a cross-section through that part of the structure referred to as the rod supporting head.

Referring now to the drawing by distinguishing reference numerals it will be observed that the stand-like jack is denoted, as a unit, by the numeral 3. It may be constructed from wood or other light-weight inexpensive material. In size it is such as can be conveniently handled and folded and stored away for compactness and convenience in transportation. That part constituting the so-called stake is denoted by the numeral 4 and is provided with a pointed lower end 5 designed to permit the stake to be properly driven in the bank or shore as illustrated in the drawing. The complemental part 6 forming the head is in the form of a longitudinally elongated strip and this is hingedly attached intermediate its ends as indicated at 7 to the upper end of the stake. At this point it is provided in its under side with a keeper notch 8 receiving the adjacent end of the stake and to promote the desired rigidity. The upper side of the head is formed with a channel or groove 9 of such shape and proportions as to accommodate the handle 10 of the conventional fishing pole or rod 11. If desired a hook 12 may be pivoted on one end of the part 6 to snap into an eye 13 on the rod to guard against accidental longitudinal slippage of the handle when once it is tied in place. As implied the principal fastening means consists of cords or equivalent ties 13, these being anchored in transverse bores or holes 14 in said part 6.

The method of application and use of the device is self-evident from the portrayal made in Figure 1 of the drawing. Under the circumstances a specific description does not appear to be essential. Nor do I find it necessary for the purposes of this application to elaborately describe the commercial aspects of the contrivance.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A portable fishing rod holder of the class described comprising a longitudinally elongated rod accommodation and supporting member provided in its upper side with a groove extending from end to end and constituting a channel for reception of the fishing rod handle, said member being provided at longitudinally spaced points with transverse openings adapted to accommodate insertable and removable cords for tying and fastening the rod in said channel, said member being provided in its under side and at a point intermediate its ends with a transverse keeper notch, a supporting and anchoring stake adapted for disposition at right angles to said member, said stake having its lower end pointed, the upper end thereof being adapted for removable reception in said keeper notch, and a hinge including sections attached to the stake and adjacent portion of said member within the vicinity of said notch to facilitate folding and to promote rigid assembled erection of the parts for use.

TOMMIE LOUISE GAYDEN SMOOT.